UNITED STATES PATENT OFFICE.

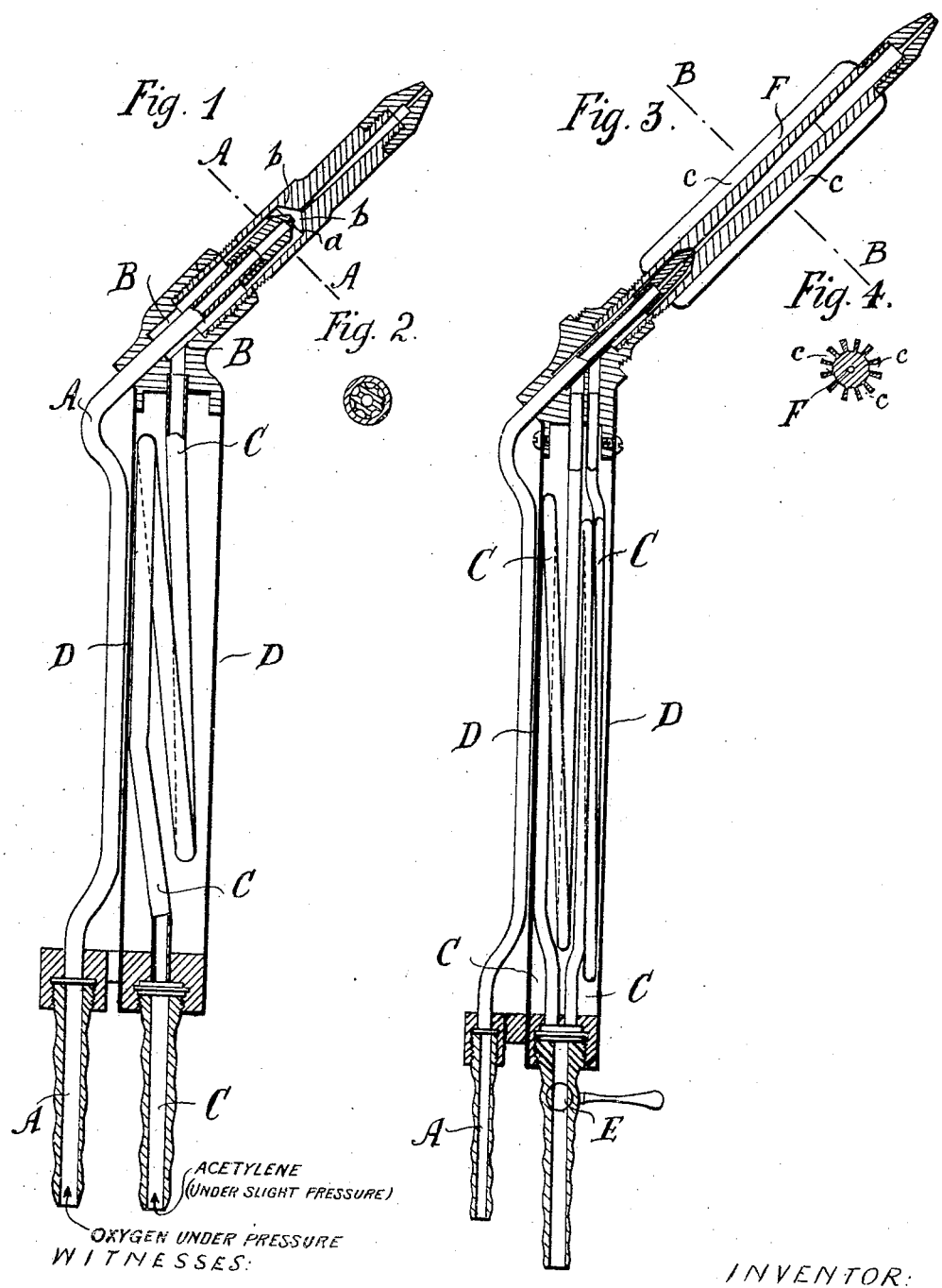

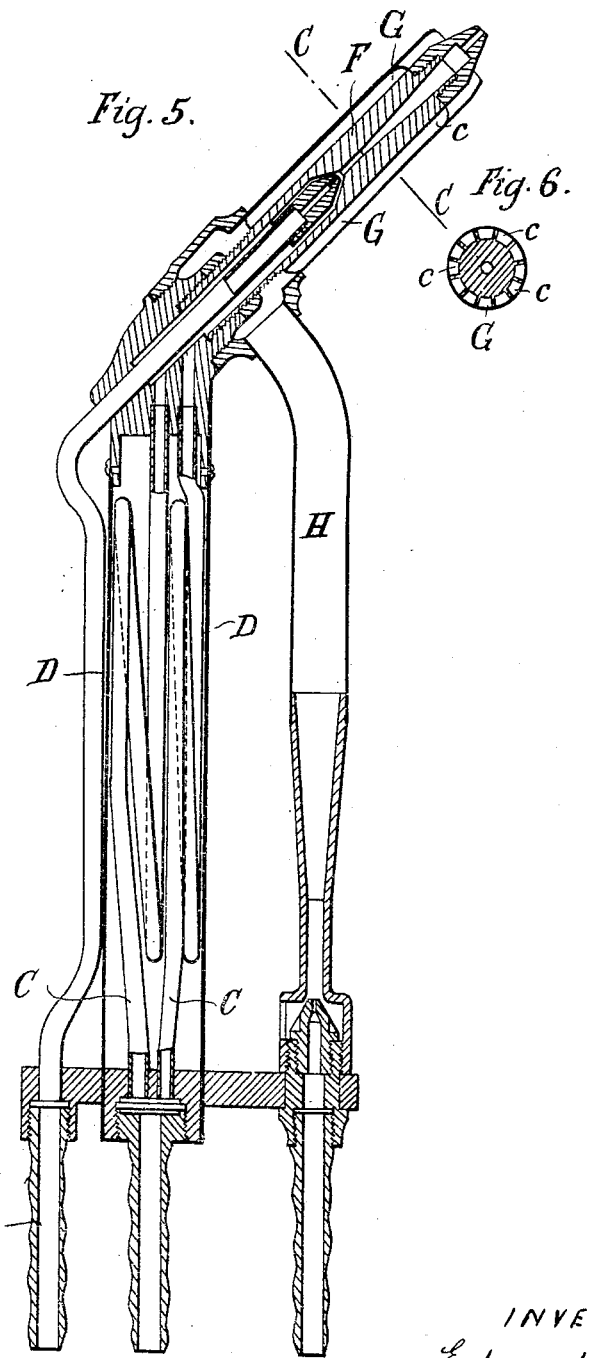

EDMOND FOUCHÉ, OF PARIS, FRANCE, ASSIGNOR TO EUGENE ALFRED JAVAL, OF PARIS, FRANCE.

GAS-BLOWPIPE.

No. 804,002.     Specification of Letters Patent.     Patented Nov. 7, 1905.

Application filed October 10, 1903. Serial No. 176,576.

*To all whom it may concern:*

Be it known that I, EDMOND FOUCHÉ, a citizen of the Republic of France, residing in Paris, France, have invented certain new and useful Improvements in Gas-Blowpipes, of which the following is a specification.

In order to obtain with a gas-blowpipe a perfectly homogeneous flame of maximum temperature, it is indispensable to mix the combustible gas and air or oxygen before they leave the appliance; but this mixture is explosive, and in order that the flame may not light back within the apparatus it is advantageous to impart pressure to the two gases, so as to insure a suitable issuing velocity for the mixture. The air or oxygen is readily obtained under pressure. If air or oxygen which has not been compressed in advance is employed, it may be placed under pressure without danger. If oxygen stored in vessels in which it is highly compressed is used, the desired conditions are present; but as it is difficult to obtain the combustible gas under pressure I have devised a blowpipe in which the air or oxygen only is employed under pressure which is sufficient to impart to the mixture, consisting of the combustible gas and the air or oxygen behind the outlet orifice or orifices of the point of the blowpipe, a strong pressure for its outflow.

To this end the blowpipe comprises an injector in which the motor fluid is oxygen or air under pressure, this fluid sucking in the combustible gas and forcing it under pressure into the central conduit of the blowpipe. This conduit is preferably of the form of a Giffard injector and is constituted by a restricted portion followed by an elongated conical conduit. As only the air or the oxygen is supplied under pressure, while the combustible gas is without pressure or at a very low pressure, it might happen if the head of the apparatus became obstructed that the air or oxygen would be forced into the conduit for the combustible gas and there produce an explosive mixture which might explode if after the outlet-orifice had been unstopped an attempt were made to use the apparatus. This explosion would be dangerous if it took place in the rubber tube conducting the gas to the apparatus. This defect is obviated by supplying the combustible gas through one or more tubes of small cross-section but of somewhat considerable development, being bent in the direction of their length or wound spirally.

Several forms of my blowpipe are represented in the accompanying drawings, in which—

Figure 1 is a vertical section through a blowpipe which is not provided with wings. Fig. 2 is a cross-section on the line A A of Fig. 1. Fig. 3 represents a blowpipe provided with cooling-wings. Fig. 4 is a cross-section on the line B B of Fig. 3. Fig. 5 is a section through a blow-pipe having an envelop around the nozzle. Fig. 6 is a cross-section on the line C C of Fig. 5.

The combustible gas is preferably acetylene, and it is preferably mixed with oxygen. The protecting-gas passing through the envelop, as hereinafter described, (if any,) is preferably a combustible gas of some kind.

The blowpipe comprises an injector $a$, in which the tube A terminates. The oxygen under pressure enters through this tube. Around the tube A is situated an annular chamber B, into which opens a tube C of small diameter—four millimeters, for example—and which is very long—one meter in length, for example. It is through this tube C, which is bent several times in the handle of the apparatus D, that the acetylene gas is supplied. This extremely long tube C instead of being bent may be wound spirally within the handle of the blowpipe. There is invariably interposed between the rubber tube through which the acetylene gas is supplied and the chamber B, in which the combustible gas is stored before being sucked along by the small conduits $b$, formed around the periphery of the injector $a$, a tube of small section and great length, affording a long path for the combustible gas for the supply of the blowpipe. It will be understood that if gas is forced back into the blowpipe the oxygen issuing through the injector forces into this tube $c$ the combustible gas there present. It is only able to mix with this gas for a very small length, and it is impossible for an explosion to extend throughout the whole length of this spirally-wound tube C and reach the rubber tube. When the oxygen has traversed the entire length of the tube C, forcing before it all the combustible gas therein, finally reaching the rubber tube which supplies the acetylene, the tube C will be filled with oxygen only, which gas is in these conditions incapable of burning or of propagating ignition.

The tube C is of small cross-sectional area. It is not, however, capillary, so that it does not occasion any considerable loss of pressure, as would be the case with a packing of metallic gauze or of asbestos, which only prevents an explosion if very tightly packed, but which presents the defect of creating an enormous resistance to the circulation of the gas.

In Figs. 3 and 5 the acetylene gas is represented as entering through two tubes C of small section and great length, bent within the handle. A cock E, Fig. 3, serves to regulate the supply of combustible gas.

It will be observed that the fine long tube through which the acetylene or other combustible gas is supplied is a permanent part of the apparatus and is interposed between the blowpipe proper and the nipple or other means by which the usual rubber tube is fastened to the blowpipe. Thus this long fine tube is always present independently of the length, diameter, or arrangement of the rubber or other supply tube. This insures safety under all conditions, as well as uniformity of pressure.

It will be seen from Figs. 3 and 4, which represent a blowpipe of large caliber, that the body F is provided with wings or ribs $c$, which serve to cool the body F, owing to the circulation of external air between these wings.

The blowpipe in Figs. 5 and 6 is also surrounded by a tube G, forming an annular chamber, which opens around nozzles of the blowpipe. It permits of the egress of a neutral or deoxidizing sheath or envelop supplied through a tube H, which gives access, for example, to a mixture of coal-gas and air formed by a Bunsen burner. In this case the wings $c$ radiate in the interval existing between the body F and the envelop G. The gaseous mixture passes over them and cools them.

Having now particularly described and ascertained the nature of my said invention and in what manner the same is to be performed, I declare that what I claim is—

1. A blowpipe comprising in combination a nozzle for admitting oxygen or air under pressure, a mixing-chamber, and conduits C of small cross-section and great length bent back and forth so as to form a path of as great an extent as possible within the handle of the blowpipe whereby the oxygen is prevented from mixing with the combustible gas within said conduit near its outer end.

2. A blowpipe adapted for use in connection with air or oxygen under pressure and a combustible gas under little or no pressure, and comprising in combination a nozzle for admitting such oxygen or air, a mixing-chamber, means for connecting a supply-tube to said blowpipe, and a conduit for the combustible gas between said mixing-chamber and said means, said conduit being of such small cross-section and great length as to prevent the air or oxygen from being forced back into said conduit and forming a mixture of oxygen with the combustible gas therein.

In witness whereof I have hereunto signed my name in the presence of two subscribing witnesses.

EDMOND FOUCHÉ.

Witnesses:
JULES ARMENGAUD, Jeune,
PAUL F. PAQUET.